United States Patent [19]

Flanders

[11] 3,898,748

[45] Aug. 12, 1975

[54] TEACHING OR LIKE DEVICES

[76] Inventor: Robert George Flanders, 76 Tarnwood Pk. Court Rd., Eltham, London SE9, England

[22] Filed: Jan. 9, 1974

[21] Appl. No.: 431,697

[52] U.S. Cl. .............................. 35/48 A; 35/35 E
[51] Int. Cl. .............................................. G09b 3/04
[58] Field of Search........... 35/48 R, 48 A, 9 E, 9 F, 35/35 D, 35 E, 36, 37, 1, 5, 6; 283/45, 46

[56] References Cited
UNITED STATES PATENTS

| | | | |
|---|---|---|---|
| 2,883,767 | 4/1959 | Bell et al. | 283/45 X |
| 3,152,403 | 10/1964 | Betz | 35/48 A X |

FOREIGN PATENTS OR APPLICATIONS

| | | | |
|---|---|---|---|
| 252,785 | 10/1948 | Switzerland | 35/35 E |

*Primary Examiner*—Robert W. Michell
*Assistant Examiner*—John H. Wolff

[57] ABSTRACT

A device for teaching typing, comprising a series of tear-out sheets in a pad, each sheet being printed with lines of typing of a selected type face and having at least one blank space below each of said lines, in which spaces a student can type an attempted repeat of the lines of typing, an immediate check on the accuracy of the student's typing thus being available, and the sheets being arranged to provide progressive instruction for the student. The sheets may also be printed with lines of shorthand characters, for use in the teaching of shorthand writing and typing.

1 Claim, 2 Drawing Figures

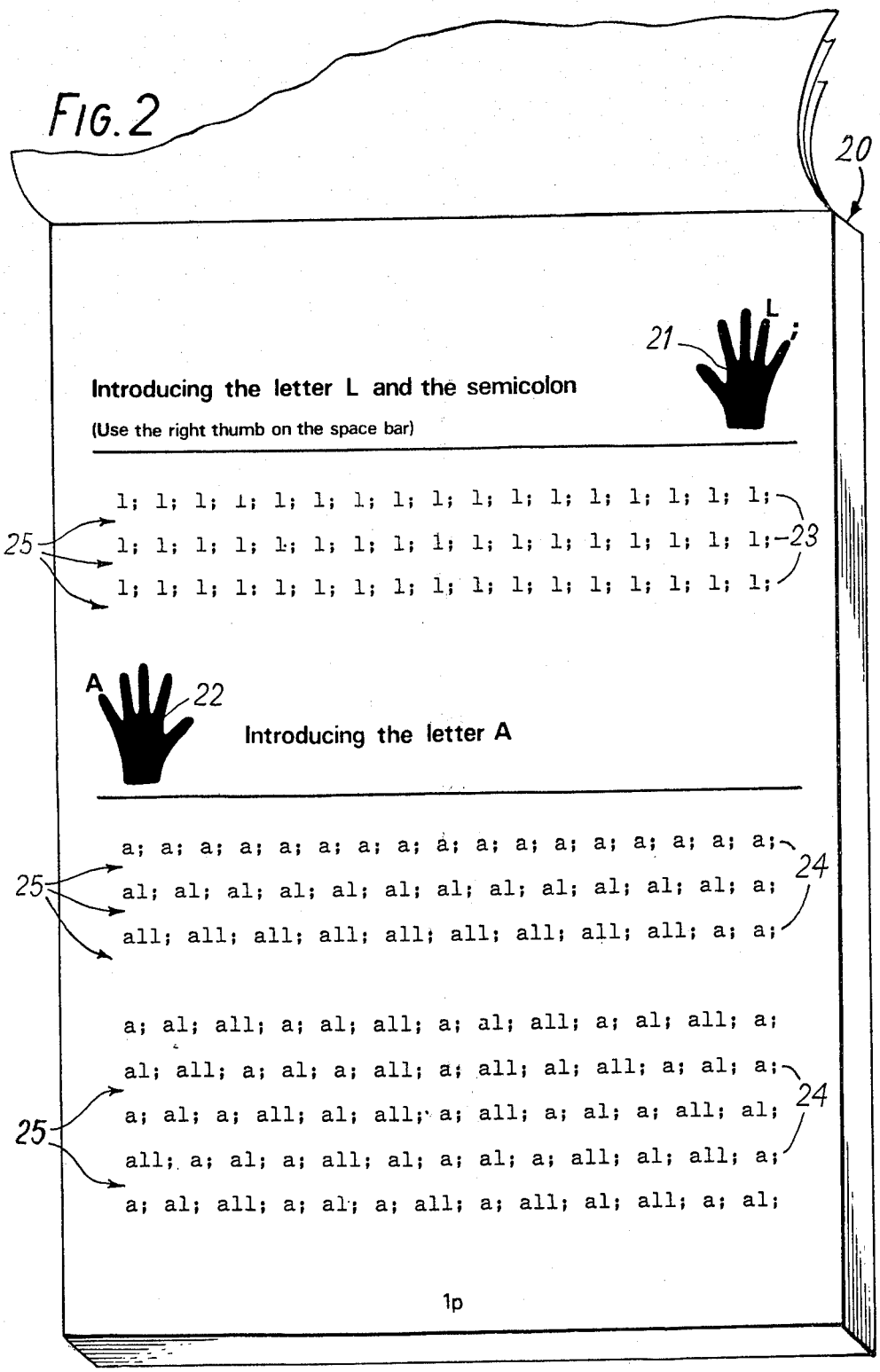

TEACHING OR LIKE DEVICES

BACKGROUND OF THE INVENTION

This invention relates to teaching devices, and is particularly applicable to the teaching of typing and shorthand.

Various methods of teaching typing and shorthand and speedwriting have previously been proposed, but these have all suffered from various disadvantages including the lack of a satisfactorily simple and rapid means of checking the work and thus also the progress of the student. It is an object of the present invention to remove or at least reduce this particular disadvantage.

SUMMARY OF THE INVENTION

According to the present invention there is provided a device for use in the teaching of typing, comprising a sheet printed with lines of typing of a selected type face and having at least one blank space below each of said lines, in which spaces a student can type an attempted repeat of the lines of typing, an immediate check on the accuracy of the student's typing thus being available.

Further according to the present invention there is provided a device for use in teaching shorthand and typing comprising a sheet which is (a) printed with lines of shorthand characters, (b) provided with a blank space below each of said lines, and (c) printed below said spaces with a transcription of said lines of shorthand characters, whereby a student can type in said spaces an attempted transcription of the lines of shorthand characters, a check on the accuracy of the student's transcription and typing being provided by the printed transcription which is effectively hidden during the student's typing.

In a modification, said lines of shorthand symbols are replaced by further blank spaces in which the student can attempt to write shorthand characters corresponding to said printed transcription, prior to inserting the sheet into a typewriter when the printed transcription will be hidden by the typewriter body.

Preferably, a series of sheets as defined above is arranged to provide progressive instruction for the student.

BRIEF DESCRIPTION OF THE DRAWINGS

FIG. 2 shows a sheet of a pad for use in teaching typing.

DESCRIPTION OF THE PREFERRED EMBODIMENTS

Figure 1:
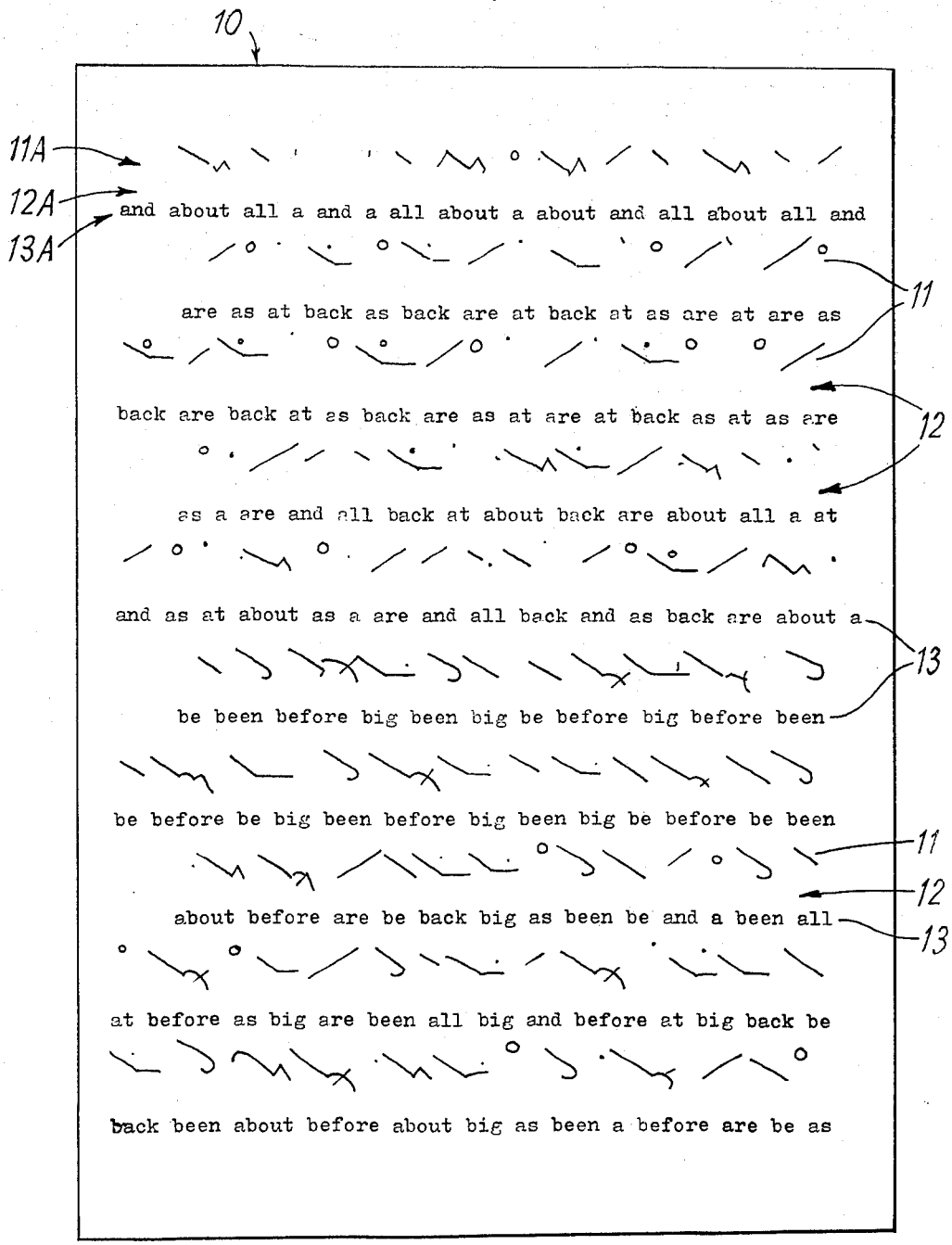
FIG. 1 shows a sheet for use in teaching typing and shorthand.

Referring to FIG. 1 of the drawings, sheet 10 is printed with lines 11 of shorthand characters, and a blank space 12 is provided below each of said lines. A transcription of the shorthand characters is printed as lines 13 below the blank spaces 12, the words of the transcription being positioned as nearly as possible in vertical register with the corresponding shorthand characters.

In use of the sheet 10, a student who has at least a reasonable knowledge of shorthand inserts the sheet in a typewriter whose type face corresponds to that of the lines 13, normally PICA or ELITE. In the correct starting position, the top space 12A is in register with the aligning scale of the typewriter, to receive typed letters; in this position, the top line 13A of the transcription is hidden by the typewriter ribbon and adjacent parts of the typewriter body. The student then types in space 12A, an attempted transcription of the top line 11A of shorthand characters. On completion of the first line, the typewriter platen can be rotated to reveal the printed transcription (13A), immediately below the student's attempt, and so provide the student with a check on accuracy. The student then rotates the platent to bring the second of the spaces 12 into register with the aligning scale and proceeds to transcribe the other lines 11, as described above, and it will be appreciated that the almost immediate "feed-back" which is available is of great assistance in teaching.

In a modification of the above sheet, the printed shorthand characters are omitted and, in this case, the student firstly writes an attempted shorthand version of the wording of lines 13 in blank spaces provided in the positions of lines 11. The sheet is then inserted in a typewriter, and the student proceeds as described in the preceding paragraph; in this case, in addition to testing the student's typing progress, tests are provided of the student's accuracy in transcribing into and from shorthand characters.

The sheets described above may be provided singly or, as is intended, in series which may be sold in the form of pads or loose-leaf books. The individual sheets of a series will be arranged as progressively advanced exercises to provide a complete course or a section of a source of instructions.

FIG. 2 shows a pad 20 of tear-out sheets, one page of which is shown and numbered "1p". The sheets of the pad are arranged as a progressive course of instruction in typewriting, and page 1p introduces the student to the letter L and the semicolon and to the letter A. The typewriter key operating the letter L and the semicolon should be depressed by the third finger of the right hand, and this is indicated by diagram 21. Similarly, diagram 22 indicates to the student that the fourth finger of the left hand should be used to type the letter A.

Page 1p is printed with lines 23 and 24 of typescript characters, and blank rows 25 are provided under the lines 23 and 24. The lines 23 and 24 are in PICA typescript (10 characters per inch) as indicated by the suffix in the page number 1p, and the other face of the sheet corresponds exactly with 1p but is printed with ELITE typescript (12 characters per inch) and numbered as page "1e".

In use of the pad 20, the student is introduced to the use of the various keys of the typewriter keyboard. After reading the pages of preliminary instructions, the student removes the first sheet (1) from the pad and inserts the sheet, with the appropriate typeface page uppermost, into a typewriter. The student then positions the sheet to type in the first blank row 25, and attempts to copy the first rows 23. As described with reference to FIG. 1, an immediate check on accuracy is available and the student progresses through the sheets of the pad which introduce all the letters and other symbols on the typewriter keyboard. The final tear-out pages of the pad give passages and letters to be copied to teach layout, punctuation, spacing, etc.

It is envisaged that the present invention has application to areas of teaching other than typewriting and shorthand. For example, the principle of the invention has proved to be useful in teaching reading to dyslexic children; in this case, the check on accuracy may be available to the teacher, in addition to the possibility of comparison for the student.

I claim:

1. A method of practicing typing and shorthand, comprising the steps of:

providing a sheet which has vertically spaced lines of shorthand characters, a blank space disposed below each of said lines and being substantially co-extensive therewith, and a typed transcription of said lines of shorthand characters disposed below each of said blank spaces;

positioning said sheet in a typewriter such that a student can type in each blank space an attempted transcription of the line of shorthand characters disposed immediately above the blank space, while the transcription disposed immediately below the blank space is hidden by the typewriter; and exposing the hidden transcription in the typewriter; whereby an immediate check on the accuracy of the student's transcription and typing is provided.

* * * * *

UNITED STATES PATENT OFFICE
CERTIFICATE OF CORRECTION

PATENT NO. : 3,898,748
DATED : August 12, 1975
INVENTOR(S) : Robert George Flanders It is certified that error appears in the above-identified patent and that said Letters Patent are hereby corrected as shown below:

Add the following to the title page:

[30] Foreign Application Priority Data
January 9, 1973   Great Britain ............1192/73

Signed and Sealed this

Twelfth Day of October 1976

[SEAL]

Attest:

RUTH C. MASON
*Attesting Officer*

C. MARSHALL DANN
*Commissioner of Patents and Trademarks*